E. E. GOLD.
COUPLING LOCK.
APPLICATION FILED DEC. 8, 1911.
1,044,166.
Patented Nov. 12, 1912.
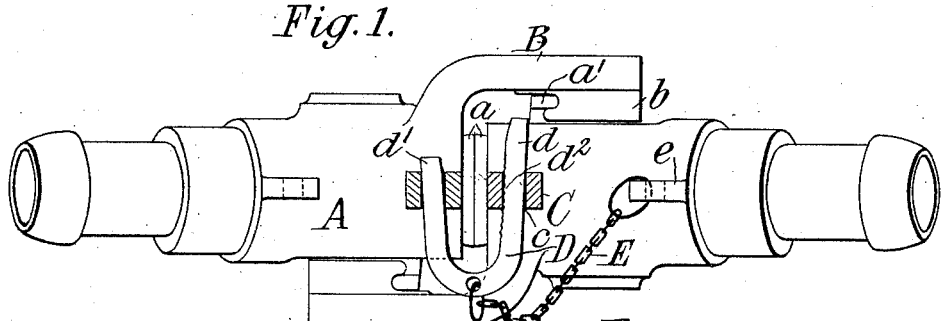
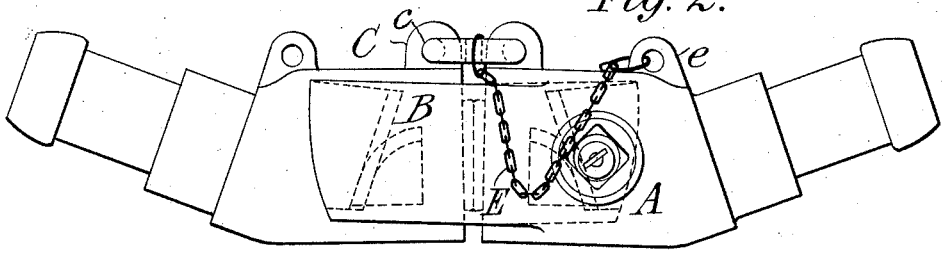
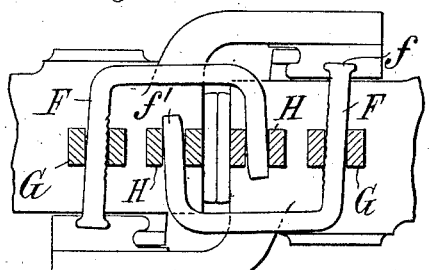
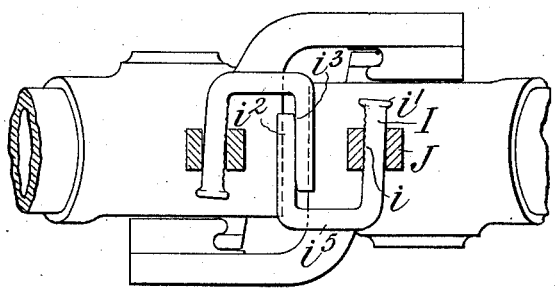
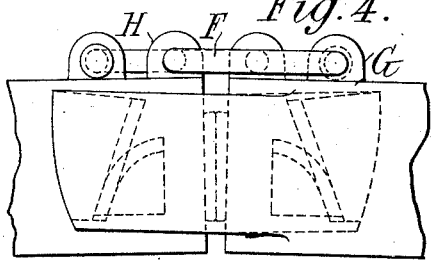
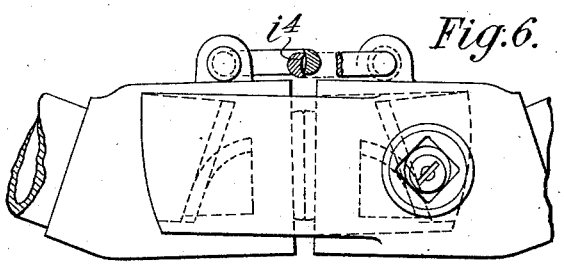
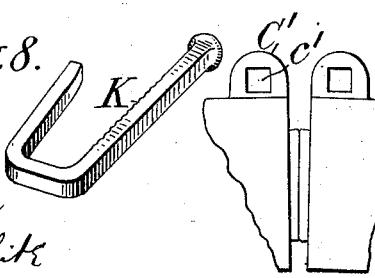
WITNESSES:
René Pruine
Fred White
INVENTOR:
Edward E. Gold,
By Attorneys,
Fraser Tinkd Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

COUPLING-LOCK.

1,044,166.  Specification of Letters Patent.  Patented Nov. 12, 1912.

Application filed December 8, 1911. Serial No. 664,623.

*To all whom it may concern:*

Be it known that I, EDWARD E. GOLD, a citizen of the United States, residing in the borough of Manhattan, city, county, and State of New York, have invented certain new and useful Improvements in Coupler-Locks, of which the following is a specification.

My invention relates to locks for rigidly and positively locking together couplers used for coupling the ends of steam hose for railway cars.

Locks of various kinds have heretofore been devised and applied to couplers for impositively locking the said couplers together. Such locks were designed to yield and permit the couplers to uncouple upon the happening of various contingencies. My lock is not designed, however, to permit the automatic uncoupling of the couplers. On the contrary, it is intended to lock the couplers at all times and to prevent any accidental uncoupling.

My invention has for its object to produce a positive lock for couplers.

A further object is to produce a lock that will hold the couplers closely together, notwithstanding wear on the gaskets and other parts, and that will compensate for such wear.

Other objects will appear as the description proceeds.

My invention consists in the employment of one or more clamps which are illustrated as substantially V-shaped, and the arms of which diverge toward their free ends and which are mounted upon the couplers in such manner that the same may slide transversely, and that when driven each arm of the clamp will slide behind a projection from the oppositely disposed mating couplers and force the couplers together, and hold them in such position.

Desirable forms in which my invention may be embodied are illustrated in the accompanying drawing where,—

Figure 1 is a plan view partly in section of a pair of couplers, illustrating my invention as applied thereto. Fig. 2 is a side elevation similar to Fig. 1. Figs. 3 and 4 are views similar to Figs. 1 and 2, illustrating a modified form. Figs. 5 and 6 are also views similar to Figs. 1 and 2, illustrating a still further modified form. Fig. 7 is a detail elevation of the coupler ports and lugs. Fig. 8 is a perspective view of a modified form of clamp.

I have illustrated my invention as applied to couplers of the familiar Gold direct-port type. In this construction each coupler body A has a direct port $a$ and an arm B. Upon each arm B is a flange $b$ which interlocks with a projection $a'$ from the side of the body A of the coupler. The couplers are assembled by a downward swinging movement which causes the flanges $b$ to pass behind the projections $a'$. This results in forcing the ports $a$ together.

My present invention relates to means whereby when said couplers are so forced together and held by the flanges $b$ and locking projections $a'$, they may be positively locked in such coupled position and prevented from separating by an upward pull upon the hose. According to my invention I provide each coupler member with a lug C upon its upper face which is perforated at $c$, the perforation extending horizontally in a direction transverse of the coupler. Within this perforated lug upon one member of the coupler is mounted an arm $d$ of a clamp D. This arm $d$ is a trifle longer than the other arm $d'$ of the said clamp, and the arm $d$ is made longer for convenience of inserting the clamp, as it is easier to insert one arm at a time. The inner part of one arm of the clamp is preferably slightly roughened as at $d^2$ for engagement with the lug C so that the clamp may be held in the position to which it may be driven. Suitable means may be provided for preventing loss of the clamp. As illustrated, such means comprise a chain E secured to the clamp at one end, and the opposite end of which is secured to a lug $e$ in the coupler, or other means might be provided for maintaining the clamp in position, as by enlarging the arm $d$ so that it does not pass out of the lug C.

In Figs. 3 and 4 a modified form is illustrated. Here the clamps are lettered F and each has an enlarged head $f$ and is mounted within a lug G upon the coupler. Upon the other coupler is situated a lug H which receives the arm $f'$ of the clamp F. This arrangement is duplicated upon each coupler so that there are two clamps F, each of which is maintained in position in the lug G and each of which may be driven transversely of the couplers into the perforated lug H. It will be perceived here that the free arm $f'$ of the clamp does not lock against the perforated lug G in which the opposite clamp is mounted, but that the entire locking strain is taken against the forward part of the lug H into which the said clamp is driven.

In Figs. 5 and 6 a further modified form of locking device is illustrated. Here the clamps which are lettered I are each mounted in a perforated lug J, and each clamp is roughened at $i$ to retain its position when it is locked. Suitable means are provided for holding the clamps which may comprise the chains E of Fig. 1 or enlarged heads $i'$. In this form the clamps are designed to interlock one with the other. To facilitate such interlocking the arms $i^2$ of the clamps are preferably beveled slightly at their forward inner edges at $i^3$ and the inner meeting edges are preferably made flat or even slightly concave as at $i^4$. Here the clamps are driven together as illustrated in Fig. 5, so that each forward arm $i^2$ passes within the opposite clamp and engages the rear side of its forward arm. Thereby as said clamps are driven together the coupler is firmly and rigidly locked in place. Preferably the back of the clamps, by which I mean the part lettered $i^5$ in Fig. 5, will be somewhat flattened as illustrated.

The clamps, although shown in the majority of the figures as being round in cross section, are not necessarily made in this shape, but may be square in cross section as illustrated in Figs. 7 and 8 where the clamp K is adapted to enter holes $c'$ in lugs C. According to my invention the clamps are made so that the arms diverge toward their free ends. Thereby the clamp will compensate for any wear upon the gaskets or ports or other parts of the coupler, and as the gaskets wear the clamps may be driven further upon the engaging projections from the coupler members and hold the couplers closely together. The clamps are preferably made of steel or some metal which has a slight spring so that they will not bend in use. As illustrated in Fig. 4, separate lugs may be employed for each end of the clamp and these lugs are separated to a sufficient extent as to provide a space between them which would receive a locking bail in case a coupler member constructed according to my invention should be coupled to a coupler member of another construction employing such locking bail or hook.

Various means of holding the arms in place may be employed. Those means shown are illustrative merely and are not the only means which might be employed for this purpose. Nor is my invention necessarily limited to the exact structural features shown, as modifications might be made therein or equivalent devices employed within the limits of the appended claims.

What I claim is:—

1. In direct port couplers having mating members, each of which members has a body portion and an arm adapted to overlap the body portion of the mating member, and locking means between each arm and body adapted to force the ports together as the coupler members are assembled, a lock for positively locking said couplers in coupled position, comprising a clamp having arms which diverge toward their free ends and having one arm mounted upon one of said coupler members and said clamp adapted to slide transversely of said coupler and to engage a projection upon the mating coupler with the other arm.

2. In direct port couplers having mating members, each of which members has a body portion and an arm adapted to overlap the body portion of the mating member, and locking means between each arm and body adapted to force the ports together as the coupler members are assembled, a lock for positively locking said couplers in coupled position, comprising perforated lugs upon each of said coupler members, a clamp having one arm mounted in one of said lugs, means for preventing the withdrawal thereof and said clamp adapted to be slid transversely of said couplers and having another arm adapted to enter the empty lug upon the other coupler member.

3. In direct port couplers having mating members, each of which members has a body portion and an arm adapted to overlap the body portion of the mating member, and locking means between each arm and body adapted to force the ports together as the coupler members are assembled, a lock for positively locking said couplers in coupled position, comprising perforated lugs upon each of said coupler members, a V-shaped clamp having its arms of unequal length and having one arm mounted in one of said lugs and adapted to be slid transversely of said couplers and having an arm adapted to enter the empty lug upon the other coupler member.

4. In direct port couplers having mating members, each of which members has a body portion and an arm adapted to overlap the body portion of the mating member, and locking means between each arm and body adapted to force the ports together as the coupler members are assembled, a lock for positively locking said couplers in coupled position, comprising perforated lugs upon each of said coupler members, a substantially V-shaped clamp having arms of unequal length, the longer arm being mounted in one of said lugs and said clamp adapted to be driven transversely of said couplers and to cause the other arm to enter the empty lug upon the other coupler member, and the driving of said clamp adapted to exert axial pressure upon said ports and to positively lock said couplers in coupled position.

5. In direct port couplers of the class described comprising mating members, each of which has a locking arm on one member adapted to engage a locking projection on the other member, means for positively locking said members in coupled position, comprising a clamp having arms of unequal length, the longer arm of which is mounted in a perforated lug upon one of said coupler members and adapted to slide transversely thereof and to cause the other arm to engage a projection from the opposite member.

6. In direct port couplers of the class described comprising mating members, each of which has a locking arm on one member adapted to engage a locking projection on the other member, means for positively locking said members in coupled position, comprising a pair of clamps, each mounted upon the surface of one of said coupler members and adapted to slide transversely thereof, and each of which has an arm adapted to engage a fixed projection in the other member.

7. In direct port couplers of the class described comprising mating members, each of which has a locking arm on one member adapted to engage a locking projection on the other member, means for positively locking said members in coupled position, comprising perforated lugs upon each of said members, a clamp mounted in one of said lugs in each member to slide transversely of said couplers and having an arm adapted to enter the other lug in the other coupler member.

8. In direct port couplers of the class described comprising mating members, each of which has a locking arm on one member adapted to engage a locking projection on the other member, means for positively locking said members in coupled position, comprising a clamp having arms which diverge toward their free ends and which is mounted to slide transversely of said couplers, having one arm mounted in a perforated lug upon one of said coupler members and means for preventing the withdrawal thereof and the other member having a projection behind which the other arm of said clamp may be driven.

9. In direct port couplers of the class described comprising mating members, each of which has a locking arm on one member adapted to engage a locking projection on the other member, means for positively locking said members in coupled position, comprising a pair of clamps, each mounted upon the surface of one of said coupler members and adapted to slide transversely thereof, each of said clamps having two arms which diverge toward their free ends, a perforated lug upon each coupler member in which one arm of one clamp is received and a second perforated lug upon the other coupler member adapted to receive the other arm of said clamp.

10. In direct port couplers of the class described comprising mating members, each of which has a locking arm on one member adapted to engage a locking projection on the other member, means for positively locking said members in coupled position, comprising a pair of clamps, each mounted upon the surface of one of said coupler members and adapted to slide transversely thereof, each of said clamps having two arms which diverge toward their free ends, one of said arms being longer than the other, a perforated lug upon each coupler member in which the longer arm of one clamp is received, and a second perforated lug upon the other coupler member adapted to receive the other arm of said clamp.

11. In direct port couplers having mating members, each of which members has a body portion and an arm adapted to overlap the body portion of the mating member, and locking means between each arm and body adapted to force the ports together as the coupler members are assembled, a lock for positively locking said couplers in coupled position, comprising a clamp mounted upon one of said coupler members and adapted to slide transversely of said coupler and having V-shaped arms of unequal length, one of which is adapted to extend over the mating coupler, and to engage behind a projection thereon.

12. In direct port couplers of the class described comprising mating members, each of which has a locking arm on one member adapted to engage a locking projection on the other member, means for positively locking said members in coupled position, comprising a clamp having arms which diverge toward their free ends and which is mounted to slide transversely of said couplers, having one arm mounted in a perforated lug upon one of said coupler members, said arm having an enlarged head whereby said clamp is retained in said lug, and the other member having a projection behind which the other arm of said clamp may be driven.

13. In direct port couplers of the class described comprising mating members, each of which has a locking arm on one member adapted to engage a locking projection on the other member, means for positively locking said members in coupled position, comprising a clamp having arms which diverge toward their free ends and which is mounted to slide transversely of said couplers, having one arm mounted in a perforated lug upon one of said coupler members and means for preventing the withdrawal thereof, and the other arm adapted to engage a projecting portion of the other member, whereby as said clamp is driven transversely the said coupler members are locked together and said clamp being adapted to draw said coupler members closer together as the parts wear and to compensate for such wear.

14. In direct port couplers of the class described comprising mating members, each of which has a locking arm on one member adapted to engage a locking projection on the other member, means for positively locking said members in coupled position, comprising a clamp having arms which diverge toward their free ends and which is mounted to slide transversely of said couplers, having one arm mounted in a perforated lug upon one of said coupler members, and the other arm adapted to engage a projecting portion of the other member, whereby as said clamp is driven transversely the said coupler members are locked together and said clamp being adapted to draw said coupler members closer together as the parts wear and to compensate for such wear, and said clamp having an enlarged head whereby it is retained in said lug.

In witness whereof, I have hereunto signed by name in the presence of two subscribing witnesses.

EDWARD E. GOLD.

Witnesses:
  HENRY M. TURK,
  FRED WHITE.

Copies of this patent may be obtained for five cents each, by addressing the "Commissioner of Patents, Washington, D. C."